US011692086B2

(12) United States Patent
Moriya et al.

(10) Patent No.: US 11,692,086 B2
(45) Date of Patent: Jul. 4, 2023

(54) MULTILAYER FILM, LAMINATED FILM, AND PACKAGING

(71) Applicant: DIC Corporation, Tokyo (JP)

(72) Inventors: Takashi Moriya, Saitama (JP); Tomohisa Kida, Saitama (JP)

(73) Assignee: DIC CORPORATION, Tokyo (JP)

( * ) Notice: Subject to any disclaimer, the term of this patent is extended or adjusted under 35 U.S.C. 154(b) by 77 days.

(21) Appl. No.: 17/611,981

(22) PCT Filed: Jul. 7, 2020

(86) PCT No.: PCT/JP2020/026615
§ 371 (c)(1),
(2) Date: Nov. 17, 2021

(87) PCT Pub. No.: WO2021/014966
PCT Pub. Date: Jan. 28, 2021

(65) Prior Publication Data

US 2022/0243043 A1 Aug. 4, 2022

(30) Foreign Application Priority Data

Jul. 23, 2019 (JP) ................................. 2019-135652

(51) Int. Cl.

| | |
|---|---|
| ***B32B 27/08*** | (2006.01) |
| ***C08L 23/06*** | (2006.01) |
| ***B32B 5/02*** | (2006.01) |
| ***B32B 15/085*** | (2006.01) |
| ***B32B 15/20*** | (2006.01) |
| ***B32B 27/10*** | (2006.01) |
| ***B32B 27/12*** | (2006.01) |
| ***B32B 27/32*** | (2006.01) |
| ***B32B 27/34*** | (2006.01) |
| ***B32B 27/36*** | (2006.01) |
| ***B32B 29/00*** | (2006.01) |
| *B32B 27/16* | (2006.01) |

(52) U.S. Cl.
CPC .............. *C08L 23/06* (2013.01); *B32B 5/022* (2013.01); *B32B 15/085* (2013.01); *B32B 15/20* (2013.01); *B32B 27/08* (2013.01); *B32B 27/10* (2013.01); *B32B 27/12* (2013.01); *B32B 27/32* (2013.01); *B32B 27/34* (2013.01); *B32B 27/36* (2013.01); *B32B 29/00* (2013.01); *B32B 27/16* (2013.01); *B32B 2270/00* (2013.01); *B32B 2307/306* (2013.01); *B32B 2307/31* (2013.01); *B32B 2307/518* (2013.01); *B32B 2307/732* (2013.01); *B32B 2439/02* (2013.01)

(58) Field of Classification Search
CPC ... B32B 15/085; B32B 15/20; B32B 2270/00; B32B 2307/306; B32B 2307/31; B32B 2307/732; B32B 2439/02; B32B 27/08; B32B 27/10; B32B 27/12; B32B 27/16; B32B 27/32; B32B 27/34; B32B 27/36; B32B 29/00; B32B 5/022; B32B 2307/30; B32B 2307/518; B32B 2435/02; B32B 27/18; C08L 23/06; C08L 2205/03; C08L 2205/035; C08L 23/04; C08L 23/14; C08L 23/20; B65D 65/40; G06F 11/36
See application file for complete search history.

(56) References Cited

FOREIGN PATENT DOCUMENTS

| | | |
|---|---|---|
| JP | 2002-234123 A | 8/2002 |
| WO | 2004/067626 A1 | 8/2004 |

OTHER PUBLICATIONS

International Preliminary Report on Patentability (Form PCT/IB/373) issued in counterpart International Application No. PCT/JP2020/026615 dated Jan. 25, 2022, with Form PCT/ISA/237, with English translation. (9 pages).
International Search Report dated Sep. 8, 2020, issued in counterpart International Application No. PCT/JP2020/026615 (2 pages).

*Primary Examiner* — Lawrence D Ferguson
(74) *Attorney, Agent, or Firm* — Whda, LLP

(57) ABSTRACT

The multilayer film of the present disclosure has at least a heat-sealing layer and a support layer formed on one side of the heat-sealing layer, wherein the first resin composition forming the heat-sealing layer comprises (a) high-density polyethylene, (b) a propylene random copolymer, and (c) a 1-butene polymer, wherein the content of the component (a) is 30 to 60% by mass, the content of the component (b) is 8 to 42% by mass, and the content of the component (c) is 16 to 56% by mass, wherein the component (a) has a melt flow rate of 10 to 30 g/10 minutes at 190° C., the component (b) has a melt flow rate of 8 to 20 g/10 minutes at 230° C., and the component (c) has a melt flow rate of 0.3 to 3 g/10 minutes at 190° C.

10 Claims, No Drawings

MULTILAYER FILM, LAMINATED FILM, AND PACKAGING

TECHNICAL FIELD

The present disclosure relates to a multilayer film, a laminated film, and a packaging material.

BACKGROUND ART

A packaging material for storing therein contents, such as food, and transporting the contents comprises a packaging container made of a resin and a lidding material made of a resin, and is required to have such high sealing properties that leakage of the contents during the boiling sterilization or retort sterilization, or opening of the packaging material due to an impact during the distribution, or the like does not occur. Meanwhile, the packaging material is also required to have easy openability such that the lidding material can be easily opened when opening is needed.

The lidding material for such a packaging material has a structure having a substrate layer forming the surface of the lidding material, and a multilayer film bonded to the substrate layer, which is to be put onto an opening portion of the container. Conventionally, there have been proposed various types of multilayer films for imparting high sealing properties and easy openability to the packaging material (see PTL 1).

CITATION LIST

Patent Literature

PTL 1: JP-A-2002-234123

SUMMARY

Technical Problem

With respect to the above-mentioned packaging material, in view of the quality control, food manufacturers and the like that use the packaging material frequently check the sealing state of the lidding material to the packaging container of the packaging material after placing food or the like in the packaging material. The sealing state can be checked by examining the release mark which is present on the surface of the opening portion of the packaging container after peeling the lidding material off the packaging container (the release mark is an opaque portion and a residue of the multilayer film of the lidding material fused to the opening portion upon sealing). Therefore, the lidding material of the packaging material is required to be able to leave a satisfactorily opaque release mark on the surface of the opening portion of the packaging container after opening the lidding material, and further required to be able to cause the release mark to have a satisfactory area (cause the release mark to have a satisfactory width) for further improving the visibility. That is, with respect to the multilayer film in the lidding material on the side that is to be sealed to the packaging container, it is desired that, after peeling the lidding material off the packaging container, a release mark having high visibility, specifically, a release mark having satisfactory opaqueness and width can be caused on the surface of the opening portion of the packaging container.

Further, it is desired that the multilayer film can achieve an appropriate sealing strength such that both high sealing properties and easy openability are obtained, and further has a satisfactory heat resistance even in an environment in which the film is heated in the presence of an oil contained in food or the like, for example, when subjected to retort sterilization.

Accordingly, an object of the present disclosure is to provide a multilayer film which has an appropriate sealing strength and heat resistance, and further is able to cause a release mark having high visibility after peeling the lidding material off, a laminated film, and a packaging material.

Solution to Problem

The present inventors have conducted extensive and intensive studies with a view toward solving the above problems. As a result, it has been found that the above-mentioned conventional problems can be solved by the multilayer film having at least a heat-sealing layer and a support layer formed on one side of the heat-sealing layer, wherein the resin composition forming the heat-sealing layer comprises (a) high-density polyethylene, (b) a propylene random copolymer, and (c) a 1-butene polymer, wherein the contents and melt flow rates of the components (a) to (c) are specified, and the present disclosure has been completed.

Specifically, the present disclosure is as follows.

[1] A multilayer film having at least a heat-sealing layer and a support layer formed on one side of the heat-sealing layer, wherein the first resin composition forming the heat-sealing layer comprises (a) high-density polyethylene, (b) a propylene random copolymer, and (c) a 1-butene polymer, wherein when the total content of the high-density polyethylene (a), the propylene random copolymer (b), and the 1-butene polymer (c) is 100% by mass, the content of the high-density polyethylene (a) is 30 to 60% by mass, the content of the propylene random copolymer (b) is 8 to 42% by mass, and the content of the 1-butene polymer (c) is 16 to 56% by mass, wherein the high-density polyethylene (a) has a melt flow rate of 10 to 30 g/10 minutes at 190° C., the propylene random copolymer (b) has a melt flow rate of 8 to 20 g/10 minutes at 230° C., and the 1-butene polymer (c) has a melt flow rate of 0.3 to 3 g/10 minutes at 190° C.

[2] The multilayer film according to item [1] above, wherein the ratio of the content of the propylene random copolymer (b) and the content of the 1-butene polymer (c) (component (b):component (c)) is 20:80 to 60:40.

[3] The multilayer film according to item [1] or [2] above, wherein the second resin composition forming the support layer comprises an ethylene resin having a melt flow rate of 0.1 to 1.0 g/10 minutes at 190° C. as a main component.

[4] The multilayer film according to any one of items [1] to [3] above, wherein the propylene random copolymer (b) is a propylene-ethylene random copolymer.

[5] The multilayer film according to any one of items [1] to [4] above, wherein the monomer of the 1-butene polymer (c) is 1-butene.

[6] The multilayer film according to any one of items [1] to [5] above, which has a thickness of 15 to 100 μm.

[7] The multilayer film according to any one of items [1] to [6] above, wherein the ratio of the thickness of the heat-sealing layer and the thickness of the support layer (heat-sealing layer:support layer) is 5:95 to 30:70.

[8] A laminated film having the multilayer film according to any one of items [1] to [7] above, and a substrate layer laminated on one side of the support layer of the multilayer film.

[9] The laminated film according to item [8] above, which is used as a lidding material in a packaging material.

[10] A packaging material comprising a packaging container having a heat-sealing surface at an opening portion, and the laminated film according to item [8] or [9] above for sealing the opening portion.

Advantageous Effects

In the present disclosure, there can be provided a multilayer film which has an appropriate sealing strength and is unlikely to be reduced in the sealing strength even after retort treatment, and has such excellent heat resistance that an advantageous sealing strength can be achieved, and which is able to cause a release mark having high visibility after peeling the lidding material off, a laminated film, and a packaging material.

DESCRIPTION OF EMBODIMENTS

Hereinbelow, the mode for carrying out the present disclosure (hereinafter, referred to as "the present embodiment") will be described in detail.

The present embodiment described below is an example for explaining the present disclosure, and should not be construed as limiting the scope of the present disclosure to the following description. The present disclosure can be variously modified within the gist of the present disclosure.

Multilayer Film

The multilayer film of the present embodiment has at least a heat-sealing layer and a support layer formed on one side of the heat-sealing layer. Further, the first resin composition forming the heat-sealing layer comprises (a) high-density polyethylene, (b) a propylene random copolymer, and (c) a 1-butene polymer, wherein when the total content of the high-density polyethylene (a), the propylene random copolymer (b), and the 1-butene polymer (c) is 100% by mass, the content of the high-density polyethylene (a) is 30 to 60% by mass, the content of the propylene random copolymer (b) is 8 to 42% by mass, and the content of the 1-butene polymer (c) is 16 to 56% by mass, wherein the high-density polyethylene (a) has a melt flew rate of 10 to 30 g/10 minutes at 190° C., the propylene random copolymer (b) has a melt flow rate of 8 to 20 g/10 minutes at 230° C., and the 1-butene polymer (c) has a melt flow rate of 0.3 to 3 g/10 minutes at 190° C.

In the multilayer film of the present embodiment, the heat-sealing layer contains predetermined high-density polyethylene (a), propylene random copolymer (b), and 1-butene polymer (c) in their respective predetermined contents, and therefore the multilayer film has an appropriate sealing strength and heat resistance, and further, when using the multilayer film in a lidding material, the multilayer film is able to cause a release mark having high visibility (large opaqueness and width) after peeling the lidding material off.

Specifically, the first resin composition constituting the heat-sealing layer contains the components (a) to (c) in their respective predetermined contents, and therefore there can be formed a phase structure (island-in-sea structure) in which the components (a) to (c) which are unlikely to be compatible with one another satisfactorily are appropriately dispersed in the first resin composition and heat-sealing layer. Accordingly, the multilayer film not only has high adhesion to the packaging container due to the components but also can easily cause a cohesive failure in the heat-sealing layer when peeling the lidding material off, so that the multilayer film can exhibit an appropriate sealing strength.

Further, the first resin composition contains the component (a) in the predetermined content, and therefore the multilayer film can have a satisfactory heat resistance even in an environment in which the film is heated in the presence of an oil contained in food or the like, for example, when subjected to retort sterilization.

Furthermore, the melt flow rates of the components (a) to (c) are in their respective predetermined ranges, and therefore a difference in fluidity can be made between the components (a) to (c) which are unlikely to be compatible with one another satisfactorily, so that the domain particle diameter in the phase structure of the first resin composition can be increased. Accordingly, the components (a) to (c) are in their respective predetermined contents, and further the domain particles (island phase) are appropriately dispersed in the phase structure of the first resin composition and the diameter of the domain particles can be increased. Thus, after the heat-sealing layer containing the first resin composition has suffered a cohesive failure, marked and increased uneven portions are formed, so that an even more opaque release mark can be caused on the packaging container.

Further, the first resin composition contains the component (a) and component (b) each having a predetermined melt flow rate in their respective predetermined contents, and therefore the first resin composition can be increased in the fluidity. By virtue of this, when the lidding material having the multilayer film is sealed to the opening portion of the packaging container, the heated portion of the first resin composition advantageously flows so that the seal width is increased, so that a release mark having an increased width can be caused on the packaging container.

The multilayer film can have formed thereon a layer other than the above-mentioned heat-sealing layer and support layer. Further, in the present specification, the high-density polyethylene (a), propylene random copolymer (b), and 1-butene polymer (c) are referred to also as "component (a)", "component (b)", and "component (c)", respectively.

Heat-Sealing Layer

In the heat-sealing layer in the present embodiment, the first resin composition forming the heat-sealing layer comprises the high-density polyethylene (a), propylene random copolymer (b), and 1-butene polymer (c). In other words, in the present embodiment, the heat-sealing layer contains the components (a), (b), and (c). Further, the heat-sealing layer is formed from the first resin composition comprising the components (a), (b), and (c). In the multilayer film of the present embodiment, the multilayer film has the heat-sealing layer, and therefore, after bonding the multilayer film, the laminated film can serve as a lidding material for sealing the opening portion of a packaging container.

(a) High-Density Polyethylene

In the present embodiment, the heat-sealing layer or first resin composition contains the high-density polyethylene (a)

which has a melt flow rate of 10 to 30 g/10 minutes at 190° C. By virtue of this, the multilayer film has an appropriate sealing strength, and further, when using the multilayer film in a lidding material, the multilayer film is able to cause a release mark having high visibility after peeling the lidding material off.

With respect to the high-density polyethylene (a) in the present embodiment, there can be used polyethylene having a density of 0.940 to 0.970 g/cm$^3$, preferably 0.950 to 0.965 g/cm$^3$. When the density of the polyethylene is in the above range, an oil resistance and a heat resistance can be imparted to the film.

The density is measured in accordance with JIS K 6922. With respect to the method for measuring a density, specifically, a density can be measured using a density-gradient tube in accordance with JIS K 6922.

The high-density polyethylene (a) in the present embodiment can be an ethylene homopolymer or a copolymer of ethylene and an α-olefin having 4 to 6 carbon atoms. With respect to the α-olefin, there is no particular limitation, but examples of α-olefins include 1-butene, 1-pentene, 3-methyl-1-butene, 1-hexene, 3-methyl-1-pentene, and 4-methyl-1-pentene. These α-olefins can be used individually or in combination. The high-density polyethylene (a) can be produced by a generally known method, such as a Phillips method, a standard method, or a Ziegler method.

The high-density polyethylene (a) has a melt flow rate at 190° C. of 10 to 30 g/10 minutes, preferably 10 to 20 g/10 minutes, more preferably 12 to 18 g/10 minutes. The melt flew rate of the high-density polyethylene (a) is 10 g/10 minutes or more, and therefore the spreadability of the heat-sealing layer upon heat-sealing is improved, so that a release mark having an increased width can be caused. Further, the melt flow rate of the high-density polyethylene (a) is 30 g/10 minutes or less, and therefore, in the step for multilayer coextrusion process, the fluidity which is not consistent with that of the adjacent layer reduces interlaminar mismatching in the multilayer flow, so that poor appearance due to the interlaminar mismatching can be suppressed.

The melt flow rate of the component (a) can be a value measured at 190° C. and 21.18 N in accordance with JIS K7210.

(b) Propylene Random Copolymer

In the present embodiment, the heat-sealing layer or first resin composition contains the propylene random copolymer (b) which has a melt flow rate of 8 to 20 g/10 minutes at 230° C. By virtue of this, the multilayer film has an appropriate sealing strength and heat resistance, and further, when using the multilayer film in a lidding material, the multilayer film is able to cause a release mark having high visibility after peeling the lidding material off.

In the present embodiment, with respect to the propylene random copolymer (b), there is no particular limitation, but examples include a random copolymer of propylene and ethylene and a random copolymer of propylene and an α-olefin having 4 to 20 carbon atoms. With respect to the α-olefin, there is no particular limitation, but examples of α-olefins include 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. Preferred is an α-olefin having 2 to 8 carbon atoms, and examples include ethylene, 1-butene, 3-methyl-1-butene, 1-hexene, and 4-methyl-1-pentene. These α-olefins can be used individually or in combination. Further, the propylene random copolymers (b) can be used individually or in combination.

The propylene random copolymer (b) contains propylene as a monomer in the resin preferably in an amount of 90 to 99 mol %, more preferably 92 to 98 mol %, further preferably 94 to 97 mol %.

In the present embodiment, with respect to the propylene random copolymer (b), preferred is a random copolymer of propylene and ethylene (propylene-ethylene random copolymer) which has been widely distributed.

In the present embodiment, the propylene random copolymer (b) has a melt flow rate at 230° C. of 8 to 20 g/10 minutes, preferably 9 to 15 g/10 minutes, more preferably 10 to 13 g/10 minutes. The melt flow rate of the propylene random copolymer (b) is 8 g/10 minutes or more, and therefore the spreadability of the heat-sealing layer upon heat-sealing is improved, so that a release mark having an increased width can be caused. Further, the melt flow rate of the propylene random copolymer (b) is 20 g/10 minutes or less, and therefore, in the step for multilayer coextrusion process, the fluidity which is not consistent with that of the adjacent layer reduces interlaminar mismatching in the multilayer flow, so that poor appearance due to the interlaminar mismatching can be suppressed.

The propylene random copolymer (b) preferably has a melting point of 120 to 145° C., more preferably 130 to 135° C. When the melting point of the propylene random copolymer (b) is 120° C. or higher, the multilayer film can be improved in the heat resistance. Further, when the melting point of the propylene random copolymer (b) is 145° C. or lower, the multilayer film is not excessively increased in the melting point, so that a satisfactory sealing strength can be obtained. The melting point is an endothermic peak temperature determined by means of a differential scanning calorimeter (DSC).

The melt flow rate of the component (b) can be a value measured at 230° C. and 21.18 N in accordance with JIS K7210.

(c) 1-Butene Polymer

In the present embodiment, the heat-sealing layer or first resin composition contains the 1-butene polymer (c) which has a melt flow rate of 0.3 to 3 g/10 minutes at 190° C. By virtue of this, when using the multilayer film in a lidding material, the multilayer film is able to cause a release mark having high visibility after peeling the lidding material off.

In the present embodiment, with respect to the 1-butene polymer (c), there is no particular limitation, but examples include a 1-butene homopolymer and a copolymer of 1-butene and another α-olefin having 2 to 20 carbon atoms. Examples of the α-olefins include ethylene, propylene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. The monomer used in the preferred 1-butene polymer (c) is an α-olefin having 2 to 8 carbon atoms, and examples of α-olefins include ethylene, propylene, 3-methyl-1-butene, 1-hexene, 4-methyl-1-pentene, and 1-octene. These α-olefins can be used individually or in combination.

Further, with respect to the 1-butene polymer (c), preferred are a 1-butene homopolymer, and an ethylene-1-butene copolymer and a propylene-1-butene copolymer, each having a 1-butene monomer as a main component, and more preferred is a homopolymer of a 1-butene monomer.

The 1-butene polymers (c) can be used individually or in combination.

In the present specification, the term “main component” means a component that occupies 50% by mass or more of the total amount (100% by mass) of the polymer or resin composition to which the component belongs. For example, the main component of the above-mentioned ethylene-1-butene copolymer is a 1-butene monomer, which corresponds to monomer units occupying 50% by mass or more of the total amount of the ethylene-1-butene copolymer.

In the present embodiment, the 1-butene polymer (c) has a melt flow rate at 190° C. of 0.3 to 3.0 g/10 minutes, preferably 0.3 to 2.0 g/10 minutes. The melt flow rate of the 1-butene polymer (c) is 0.3 g/10 minutes or more, and therefore the extrusion load caused during the melt extrusion processing can be reduced. Further, the melt flow rate of the 1-butene polymer (c) is 3.0 g/10 minutes or less, and therefore the diameter of domain particles dispersed in the island-in-sea structure of the mixed resin layer constituting the heat-sealing layer can be increased.

The 1-butene polymer (c) preferably has a melting point of 115 to 130° C., more preferably 120 to 128° C. When the melting point of the 1-butene polymer (c) is 115° C. or higher, the multilayer film can be improved in the heat resistance. Further, when the melting point of the 1-butene polymer (c) is 130° C. or lower, the multilayer film is not excessively increased in the melting point, so that a satisfactory sealing strength can be obtained. The melting point is an endothermic peak temperature determined by means of a differential scanning calorimeter (DSC).

The melt flow rate of the component (c) can be a value measured at 190° C. and 21.18 N in accordance with JIS K7210.

Other Components

In the heat-sealing layer or first resin composition in the present embodiment, an additional resin other than the above-mentioned components (a) to (c) may be used. As such an additional resin, an olefin resin other than the above-mentioned components (a) to (c) or the like can be mixed. With respect to the olefin resin other than the above-mentioned polypropylene resins, there is no particular limitation, but, for example, a polyethylene resin is preferred. Examples of such resins include polyethylene resins, such as a linear low-density polyethylene (LLDPE), a low-density polyethylene (LDPE), and a medium-density polyethylene (MDPE), an ethylene-vinyl acetate copolymer, an ethylene-methyl acrylate copolymer, an ethylene-ethyl acrylate copolymer, and an ethylene-methacrylic acid copolymer. These ethylene resins may be used individually or in combination.

The content of the additional resin in the heat-sealing layer or first resin composition is preferably 20% by mass or less, more preferably 10% by mass or less, based on the mass of the first resin composition, from the viewpoint of the heat resistance.

Further, in the heat-sealing layer or first resin composition, an additive, such as an anti-blocking agent, an ultraviolet absorber, a light stabilizer, an antistatic agent, an anti-fogging agent, or a colorant, may be appropriately added. When using the above additive, the amount of the additive used is preferably 2% by mass or less, more preferably 0.01 to 1% by mass, based on the mass of the first resin composition used for the heat-sealing layer (100% by mass).

Content of Each Component

In the present embodiment, when the total content of the components (a) to (c) is 100% by mass, the content of the high-density polyethylene (a) is 30 to 60% by mass, preferably 40 to 55% by mass, more preferably 45 to 50% by mass.

The content of the component (a) is in the above range, and therefore, in the phase structure (island-in-sea structure) in the heat-sealing layer or first resin composition, the content of the component (a) which is unlikely to be satisfactorily compatible with the components (b) and (c) can be appropriately controlled, making it possible to appropriately dispersing the individual components in the phase structure. Accordingly, the multilayer film not only has high adhesion due to the components but also can easily cause a cohesive failure in the phase structure, so that the multilayer film can exhibit an appropriate sealing strength. Further, the content of the component (a) is appropriately controlled, and thus, after a cohesive failure is caused, increased uneven portions are formed, and therefore an even more opaque release mark can be caused on the packaging container after peeling the multilayer film off.

Further, the content of the component (a) is 30% by mass or more, and therefore the component (a) having a relatively large melt flow rate is present in a certain amount such that the heat-sealing layer or first resin composition can be improved in the fluidity, so that a release mark having an increased width can be caused on the packaging container.

Further, the content of the component (a) is 60% by mass or less, and therefore the melting point of the first resin composition can be maintained, making it possible to improve the heat resistance.

In the present embodiment, when the total content of the components (a) to (c) is 100% by mass, the content of the propylene random copolymer (b) is 8 to 42% by mass, preferably 15 to 40% by mass, more preferably 25 to 30% by mass.

The content of the component (b) is in the above range, and therefore, in the phase structure (island-in-sea structure) in the heat-sealing layer or first resin composition, the content of the component (b) which is unlikely to be satisfactorily compatible with the components (a) and (c) can be appropriately controlled, making it possible to appropriately dispersing the individual components in the phase structure. Accordingly, the multilayer film can exhibit an appropriate sealing strength. Further, the individual components are appropriately dispersed in the phase structure, and thus, after a cohesive failure is caused, increased uneven portions are formed, and therefore an even more opaque release mark can be caused on the packaging container after peeling the multilayer film off.

Further, the content of the component (b) is 8% by mass or more, and therefore the component (b) having a relatively large melt flow rate is present in the heat-sealing layer or first resin composition in a certain amount such that a release mark having an increased width can be caused. Further, the melting point of the first resin composition can be maintained, making it possible to improve the heat resistance.

Further, the content of the component (b) is 42% by mass or less, and therefore a release mark having an increased degree of whitening can be caused.

In the present embodiment, when the total content of the components (a) to (c) is 100% by mass, the content of the 1-butene polymer (c) is 16 to 56% by mass, preferably 20 to 35% by mass, more preferably 25 to 30% by mass.

The component (c) having a relatively low melt flow rate is contained, and therefore a difference in fluidity can be made between the components (a) to (c) which are unlikely to be compatible with one another satisfactorily, so that the diameter of the island portions (domain particles) in the phase structure can be increased. Accordingly, after a cohesive failure is caused, marked uneven portions can be formed. Further, the content of the component (c) is in the above range, and thus, after a cohesive failure is caused, increased uneven portions can be formed. Therefore, a satisfactorily opaque release mark can be caused after peeling the multilayer film off.

Further, the content of the component (c) is in the above range, and thus the content of the component (c) can be appropriately controlled, so that the multilayer film can exhibit an appropriate sealing strength.

Furthermore, the content of the component (c) is 56% by mass or less, and therefore the multilayer film can be improved in heat resistance, for example, in a retort environment in which the film is heated in the presence of an oil contained in the contents of a packaging material using the multilayer film. Further, the fluidity of the heat-sealing layer or first resin composition can be surely obtained, so that a release mark having an increased width can be caused.

Further, in the present embodiment, the ratio of the content of the propylene random copolymer (b) and the content of the 1-butene polymer (c) (component (b):component (c)) is preferably 20:80 to 60:40, more preferably 30:70 to 55:45, further preferably 40:60 to 50:50.

When the component, (b):component (c) ratio is 20:80 or more, not only can an appropriate sealing strength and heat resistance be obtained, but also a release mark having an increased width can be caused after peeling the lidding material off. Further, when the component (b):component (c) ratio is 60:40 or less, an appropriate sealing strength can be achieved, and further an even more opaque release mark can be caused.

In the present embodiment, the components (a) to (c) are present in the heat-sealing layer or first resin composition (100% by mass) preferably in an amount of 80% by mass or more, more preferably 90% by mass or more, further preferably 95% by mass or more, most preferably 100% by mass.

Thickness of the Heat-Sealing Layer

In the present embodiment, the heat-sealing layer preferably has a thickness of 1.5 to 15 μm, more preferably 2 to 10 μm, further preferably 3 to 8 μm. When the thickness of the heat-sealing layer is 1.5 μm or more, there can be obtained a multilayer film which has an appropriate sealing strength and heat resistance, and further is able to cause a release mark having high visibility after peeling the lidding material off. Further, when the thickness of the heat-sealing layer is 15 μm or less, poor appearance caused after peeling the lidding material off, such as fluffing, can be suppressed.

Support Layer

In the present embodiment, the support layer is formed from the second resin composition. In the present embodiment, with respect to the second resin composition forming the support layer, there is no particular limitation, but the second resin composition can contain, for example, an ethylene resin or a propylene resin. Particularly, in the present embodiment, it is preferred that the second resin composition comprises an ethylene resin having a melt flow rate of 0.1 to 1.0 g/10 minutes at 190° C. as a main component. When the resin composition contains an ethylene resin, not only the heat-sealing layer but also the resin composition for the support layer can be improved in the fluidity, so that a release mark having an increased width can be caused.

In the present embodiment, with respect to the ethylene resin which can be used in the support layer or second resin composition, there can be used polyethylene having a density of 0.910 to 0.965 g/cm$^3$, preferably a density of 0.930 to 0.960 g/cm$^3$. When the density of the polyethylene is in the above range, a heat resistance can be obtained, and therefore the multilayer film can be applied to heating for retort sterilization or the like.

In the present embodiment, when the support layer or second resin composition contains an ethylene resin, the content of the ethylene resin is preferably 80% by mass or more, more preferably 90% by mass, further preferably 95% by mass, based on the mass of the support layer or second resin composition (100% by mass).

When the content of the ethylene resin is 80% by mass or more, a release mark having a satisfactorily increased width can be caused.

In the present embodiment, the second resin composition preferably has a melt flow rate at 190° C. of 0.1 to 1.0 g/10 minutes, more preferably 0.2 to 0.8 g/10 minutes, further preferably 0.4 to 0.7 g/10 minutes.

When the melt flow rate of the second resin composition is 0.1 g/10 minutes or more, a release mark having an increased width can be caused after peeling the lidding material off, and, when the melt flow rate of the second resin composition is 1.0 g/10 minutes or less, excessive flow of the resin upon heat-sealing can be suppressed.

In the present embodiment, in the support layer or second resin composition, like in the above-mentioned heat-sealing layer, an appropriate additive may be used.

In the present embodiment, the support layer preferably has a thickness of 10 to 98.5 μm, more preferably 20 to 90 μm, further preferably 21 to 42 μm. When the thickness of the support layer is 10 μm or more, a seal mark having an increased width can be caused. Further, when the thickness of the support layer is 98.5 μm or less, excessive flow of the resin upon heat-sealing can be suppressed.

In the multilayer film of the present embodiment, the support layer may have a single layer, or may have a multilayer construction of two or more layers. Particularly, in the case where the proportion of the thickness of the support layer to the total thickness of the multilayer film is large, when the multilayer film, which has the support layer having a multilayer construction of two or more layers, is produced using, for example, a coextrusion method, the thickness of each of the heat-sealing layer and the support layer can be easily controlled, and further a multilayer film having excellent homogeneity can be obtained. When the support layer has a multilayer construction, each layer of the support layer is preferably a layer using the above-exemplified resin, and the resin compositions constituting the individual layers of the support layer may be the same mixture, or may be mixtures of resins having different melt flow rates or densities, mixtures having different mixing ratios of resins, or the like.

Thickness and Properties of the Multilayer Film

In the present embodiment, from the viewpoint of the recent tendency of reduction of the weight of the packaging material and the easy openability, the thickness (total thickness) of the multilayer film is preferably 15 to 100 μm, especially, more preferably in the range of from 25 to 70 μm.

With respect to the thickness of each layer of the multilayer film, the thickness of the support layer is preferably 80 to 95%, more preferably 85 to 93% of the total thickness of the film. Further, the thickness of the heat-sealing layer is preferably in the range of from 5 to 20%, more preferably in the range of from 7 to 15% of the total thickness of the film. When the thickness is in the above range, the heat-sealing strength stably exhibits such appropriate easy openability that the film is unlikely to be torn upon opening the lidding material.

In the present embodiment, from the viewpoint of the protection of the contents, the multilayer film preferably has a sealing strength (in the state before being subjected to the below-mentioned retort conditions) of 10 N/15 mm or more, more preferably 12 N/15 mm or more, further preferably 13 N/15 mm or more.

Further, the sealing strength after subjected to the retort conditions is preferably 10 N/15 mm or more, more preferably 12 N/15 mm or more, further preferably 13 N/15 mm or more. When the sealing strength after subjected to the retort conditions is in the above range, the multilayer film having such a sealing strength has especially excellent heat resistance and retort resistance.

Further, from the viewpoint of the easy openability of the lidding material, the above-mentioned sealing strength is preferably 20 N/15 mm or less, more preferably 18 N/15 mm, further preferably 17 N/15 mm.

The above-mentioned sealing strength (before subjected to the retort conditions and after subjected to the retort conditions) can be measured by the method described in the item "Evaluation of heat resistance" in the Examples below.

Further, the retention ratio of the sealing strengths before and after subjected to the retort conditions, which is represented by: (sealing strength after subjected to the retort conditions/sealing strength before subjected to the retort conditions)×100(%), is preferably 80% or more, further preferably 90% or more. When the retention ratio of the sealing strengths before and after subjected to the retort conditions is in the above range, the multilayer film having such a retention ratio has especially excellent heat resistance and retort resistance.

In the present embodiment, with respect to the multilayer film, when the multilayer film and a predetermined sheet are heat-sealed by the method described in the item "Evaluation of release mark" in the Examples below, the width of the release mark is preferably 1.0 mm or more, more preferably 1.2 mm or more.

Method for Producing the Multilayer Film

With respect to the method for producing the multilayer film of the present embodiment, there is no particular limitation, but, for example, there can be mentioned a coextrusion method in which the resins or first and second resin compositions used in the layers of the film are individually heat-melted by separate extruders, and laminated in a molten state by a method, such as a multi-manifold co-extrusion dice method or a feedblock method, to obtain a heat-sealing layer/support layer, followed by forming into a film by a blowing extrusion or T-die chill-roll method or the like. The coextrusion method is advantageous in that it is possible to relatively freely control the ratio of the thicknesses of the individual layers, and in that a multilayer film having excellent hygienic qualities and excellent cost performance ratio can be obtained. When a resin having a large difference between the melting point and the Tg is laminated, it is likely that the appearance of the film becomes poor during the coextrusion processing, or the formation of uniform layer construction is difficult. For suppressing such a disadvantage, preferred is a T-die chill-roll method in which melt extrusion can be conducted at a relatively high temperature.

Further, when the surface of the support layer on another side is subjected to printing, lamination, or the like, for improving the adhesion to a printing ink or a bonding agent and the like, it is preferred that the surface of the support layer is subjected to surface treatment. Examples of such surface treatments include surface oxidation treatments, such as a corona treatment, a plasma treatment, a chromate treatment, a flame treatment, a hot-air treatment, and an ozone-ultraviolet treatment, and surface roughening treatments, such as sandblasting, but preferred is a corona treatment.

Laminated Film

The laminated film of the present embodiment has the above-mentioned multilayer film according to the embodiment of the present disclosure, and a substrate layer laminated on one side of the support layer of the multilayer film. Specifically, the laminated film of the present embodiment is a laminated material which has a multilayer film having at least a support layer and a heat-sealing layer formed on one surface of the support layer, and a substrate layer formed on another surface of the support layer. Thus, the laminated film can be obtained by laminating the substrate layer on the surface of the support layer. Examples of materials for the substrate layer include a biaxially oriented polyester film, a biaxially oriented nylon film, nonwoven fabric, an aluminum foil, and paper. In the substrate layer, a single type of film, or two or more types of films which are laminated may be used.

The laminated film having the substrate layer laminated on the multilayer film as mentioned above can be advantageously used, for example, as a lidding material in the below-mentioned packaging material.

As examples of the method for laminating the substrate layer onto the multilayer film, there can be mentioned a dry lamination method, a heat lamination method, and a multilayer extrusion coating method, but, of these, a dry lamination method is more preferred. Further, when laminating the multilayer film and the substrate layer by a dry lamination method, examples of usable bonding agents include a polyether-polyurethane bonding agent and a polyester-polyurethane bonding agent.

Further, it is preferred that, before laminating the multilayer film and the substrate layer, the surface of the support layer is subjected to surface treatment, such as corona discharge treatment, as mentioned above, because the adhesion to the substrate layer is improved.

Packaging Material

The packaging material of the present embodiment comprises a packaging container having a heat-sealing surface at an opening portion, and the above-mentioned laminated film according to the embodiment of the present disclosure for sealing the opening portion. With respect to the contents which the packaging material of the present embodiment can contain therein, there is no particular limitation, but the packaging material can be advantageously used for packaging, for example, food, sanitary products, medical and pharmaceutical products, and the like.

In the present embodiment, it is preferred that the heat-sealing surface at the opening portion of the packaging container is formed from a third resin composition containing a polypropylene resin. When the heat-sealing surface is formed from the third resin composition containing a polypropylene resin, high heat resistance can be easily achieved, and further an appropriate sealing strength of the opening portion of the packaging container and the lidding material is achieved, making it possible to obtain a packaging material which has excellent easy openability, and which can maintain a sealing strength such that the contents do not leak during the heating treatment.

With respect to the packaging container, there is no limitation as long as the packaging container has an opening portion and the heat-sealing surface is formed from the third resin composition containing a polypropylene resin, but the whole of the packaging container can be formed from the third resin composition.

Examples of polypropylene resins include a propylene homopolymer and copolymers of propylene and an α-olefin, such as a propylene homopolymer, a propylene-ethylene copolymer, a propylene-1-butene copolymer, and a propylene-ethylene-1-butene copolymer. Of these polypropylene resins, a polypropylene resin in which the content of the propylene monomer units in the polymer is 70 mol % or more can advantageously achieve a satisfactory sealing strength.

Further, the third resin composition forming the heat-sealing surface at the opening portion of the packaging container preferably comprises a polypropylene resin as a main component, and more preferably has a polypropylene resin content of 60% by mass or more, further preferably 80% by mass or more. When the polypropylene resin content is in the above range, a satisfactory sealing strength can be advantageously obtained. Further, with respect to the resin that may be used in the heat-sealing surface in combination with the polypropylene resin, there is no particular limitation as long as it is a resin which is well compatible with the polypropylene resin, and which does not inhibit heat-sealing, but examples of such resins include polyethylene resins, such as an ethylene homopolymer and an ethylene-α-olefin copolymer.

Hereinabove, the embodiment of the present disclosure was described, but the multilayer film, laminated film, and packaging material of the present disclosure are not limited to the above-mentioned examples but can be appropriately changed.

EXAMPLES

Hereinbelow, the present disclosure will be described in more detail with reference to the following Examples, which should not be construed as limiting the scope of the disclosure.

Methods for Measurement and Evaluation

With respect to each of the multilayer films obtained in the Examples and Comparative Examples, the measurement and evaluation were conducted in accordance with the methods described below.

(1) Melt Flow Rate

A melt flow rate of each resin for producing the multilayer film was measured in accordance with JIS K7210. The measurement temperature for the component (a), the component (c), and the resin composition forming the support layer was 190° C., and that for the component (b) was 230° C.

(2) Measurement of a Thickness

A thickness of the multilayer film was measured using a dial gauge. Further, a thickness of each layer of the multilayer film was measured as follows. Using a rotary microtome, manufactured by Nihon Microtome Laboratory, Inc., a thin section having a thickness of 3 to 20 μm was cut, and the cross-section of the multilayer film was examined using an optical microscope, and a ratio of the thicknesses of the layers was determined and a thickness of each layer was calculated from the ratio.

(3) Evaluation of Release Mark

A biaxially oriented PET (thickness: 12 μm), an aluminum foil (thickness: 7 μm), and the obtained multilayer film were dry-laminated in this order using an urethane bonding agent to obtain a laminated film, and then the multilayer film surface of the laminated film was put on a polypropylene sheet having a thickness of 0.3 mm, and a circular sealing head (cross-sectional form, taken along the direction perpendicular to the extending direction, is 70 mmϕ of a half-moon form with R=4 mm) was placed on the laminated film side under conditions at 180° C. under 180 kgf for one second to heat-seal the laminated film and the polypropylene sheet. Subsequently, the heat-sealed laminated film was peeled off the polypropylene sheet, and the appearance of the polypropylene sheet obtained after peeling the laminated film was observed and evaluated.

(i) Release mark width: A line width of the release mark was measured using a scale, and evaluated according to the following criteria.

A: 1.2 mm or more
B: 1.0 to less than 1.2 mm
C: Less than 1.0 mm (ii) Release mark whitening degree: A degree of whitening of the release mark was visually examined, and evaluated according to the following criteria.

A: Whitening can be clearly found.
B: Whitening is definite.
C: No whitening can be found.

(4) Evaluation of Heat Resistance

The multilayer film surface of the laminated film obtained by the method described in the item "Evaluation of release mark" above was put on a brim portion of a 350 $cm^3$ polypropylene container which was fully filled with water/salad oil=80/20, wherein the brim portion has a width of 5 mm and is in a circular form having an outer diameter of 95 mmϕ, and has a thickness of 600 μm. Then, using a packaging machine (Cup Sealer, manufactured by Shinwa Kikai Co., Ltd.), the laminated film and the brim portion of the container were heat-sealed under conditions such that the temperature was 170° C., the lead was 160 kgf, and the time was one second to obtain a packaging material. The obtained packaging material was subjected to retort sterilization treatment at 121° C. for 30 minutes. The resultant laminated film was cut into a specimen having a width of 15 mm, and, using a tensile tester (Tensilon universal testing machine, manufactured by A & D Company, Limited), a sealing strength was measured in an environment at a temperature of 23° C.

under conditions such that the peel angle was 90 degrees and the rate of pulling was 300 mm/minute, and the sealing strengths measured before and after subjected to the retort sterilization treatment were compared.

The resins for the components used in the Examples and Comparative Examples are described below.

Heat-Sealing Layer (a) High-Density Polyethylene

HDPE 1: High-density polyethylene [density: 0.96 g/cm$^3$; MFR (190° C.): 15 g/10 minutes]

HDPE 2: High-density polyethylene [density: 0.96 g/cm$^3$; MFR (190° C.): 7 g/10 minutes]

(b) Propylene Random Copolymer

PP 1: Propylene-ethylene random copolymer [MFR (230° C.): 11 g/10 minutes; melting point: 130° C.]

PP 2: Propylene-ethylene random copolymer [MFR (230° C.): 1.5 g/10 minutes; melting point: 128° C.]

PP 3: Propylene-ethylene random copolymer [MFR (230° C.): 7 g/10 minutes; melting point: 140° C.]

(c) 1-Butene Polymer

PB 1: Polybutene-1 (1-butene homopolymer) [MFR (190° C.): 1.8 g/10 minutes; melting point: 125° C.]

PB 2: Polybutene-1 (1-butene-ethylene copolymer) [MFR (190° C.): 4 g/10 minutes; melting point: 100° C.]

PB 3: Polybutene-1 (1-butene homopolymer) [MFR (190° C.): 0.4 g/10 minutes; melting point: 128° C.]

Support Layer

PE 1: High-density polyethylene [density: 0.96 g/cm$^3$; MFR (190° C.): 0.4 g/10 minutes]

PE 2: Ethylene-octene copolymer LLDPE obtained by polymerization using a metallocene catalyst [density: 0.90 g/cm$^3$; MFR (190° C.): 1.0 g/10 minutes]

Next, the Examples and Comparative Examples will be described.

Examples 1 to 5 and Comparative Examples 1 to 7

As a resin component for forming each of the heat-sealing layer and the support layer, the above-mentioned resins were mixed in the formulation described in Table 1 to prepare resin compositions in the Examples and resin mixtures in the Comparative Examples (hereinafter, referred to simply as "resin composition(s) or the like") for forming each of the layers. As extruders for the support layer, separate extruders for two layers, i.e., an extruder for intermediate layer (bore diameter: 40 mm) and an extruder for surface layer (bore diameter: 30 mm) were used. To these extruders were fed the resin compositions or the like for the support layer, and the resin composition or the like for the heat-sealing layer was fed to an extruder for the heat-sealing layer (bore diameter: 30 mm). Coextrusion from a T-die was conducted at an extrusion temperature of 280° C. so that the average thickness of each layer of the multilayer film became as follows: heat-sealing layer/support layer (intermediate layer)/support layer (surface layer)=7.5 μm/30 μm/12.5 μm, and the resultant film was cooled using a cooling roll at 40° C. to obtain a multilayer film having a total thickness of 50 μm. The surface layer of the support layer was subjected to corona discharge treatment.

The component (b) in the heat-sealing layer in Example 2 had an MFR of 8.6 g/10 minutes, and the component (a) in the heat-sealing layer in Example 6 had an MFR of 12 g/10 minutes. Further, the resin composition or the like forming the support layer in each of the Examples and Comparative Examples had an MFR of 0.6 g/10 minutes.

TABLE 1

| | | | | Exp. 1 | Exp. 2 | Exp. 3 | Exp. 4 | Exp. 5 | Exp. 6 | Exp. 7 | Exp. 8 | Exp. 9 |
|---|---|---|---|---|---|---|---|---|---|---|---|---|
| Layer Construction of film | Resin formulation of heat-sealing layer (mass %) | (a) | HDPE1 | 40 | 40 | 50 | 30 | 40 | 30 | 40 | 40 | 40 |
| | | | HDPE2 | | | | | | 10 | | | |
| | | MFR | | 15 | 15 | 15 | 15 | 15 | 12 | 15 | 15 | 15 |
| | | (b) | PP1 | 30 | 15 | 25 | 40 | 20 | 30 | 30 | 30 | 30 |
| | | | PP2 | | | | | | | | | |
| | | | PP3 | | 15 | | | | | | | |
| | | MFR | | 11 | 8.6 | 11 | 11 | 11 | 11 | 11 | 11 | 11 |
| | | (c) | PB1 | 30 | 30 | 25 | 30 | 40 | 30 | | 30 | 30 |
| | | | PB2 | | | | | | | | | |
| | | | PB3 | | | | | | | 30 | | |
| | | MFR | | 1.8 | 1.8 | 1.8 | 1.8 | 1.8 | 1.8 | 0.4 | 1.8 | 1.8 |
| | Content of component (b): content of component (c) | | | 50:50 | 50:50 | 50:50 | 57:43 | 33:67 | 50:50 | 50:50 | 50:50 | 50:50 |
| | Thickness of heat-sealing layer (μm) | | | 7.5 | 7.5 | 7.5 | 7.5 | 7.5 | 7.5 | 7.5 | 7.5 | 7.5 |
| | Resin formulation of support layer (mass %) | | PE1 | 50 | 50 | 50 | 50 | 50 | 50 | 50 | 70 | 30 |
| | | | PE2 | 50 | 50 | 50 | 50 | 50 | 50 | 50 | 30 | 70 |
| | Thickness of support layer (μm) | | | 42.5 | 42.5 | 42.5 | 42.5 | 42.5 | 42.5 | 42.5 | 42.5 | 42.5 |
| | Total thickness (μm) | | | 50 | 50 | 50 | 50 | 50 | 50 | 50 | 50 | 50 |
| Results of evaluation | Release mark width | | | A | A | A | A | A | A | A | A | A |
| | Release mark whitening degree | | | A | A | A | A | A | A | A | A | A |
| | Sealing strength (before retort) (N/15 mm) | | | 14 | 15 | 17 | 13 | 15 | 15 | 16 | 13 | 15 |
| | Sealing strength (after retort) (N/15 mm) | | | 15 | 16 | 16 | 13 | 14 | 15 | 17 | 13 | 17 |

TABLE 1-continued

| | | | | Comp. Exp. 1 | Comp. Exp. 2 | Comp. Exp. 3 | Comp. Exp. 4 | Comp. Exp. 5 | Comp. Exp. 6 | Comp. Exp. 7 | Comp. Exp. 8 |
|---|---|---|---|---|---|---|---|---|---|---|---|
| Layer Construction of film | Resin formulation of heat-sealing layer (mass %) | (a) | HDPE1 | 50 | 40 | | 40 | 50 | 70 | 20 | 50 |
| | | | HDPE2 | | | 40 | | | | | |
| | | | MFR | 15 | 15 | 7 | 15 | 15 | 15 | 15 | 15 |
| | | (b) | PP1 | | | 30 | 30 | | 15 | 40 | 50 |
| | | | PP2 | | 30 | | | | | | |
| | | | PP3 | 50 | | | | | | | |
| | | | MFR | 7 | 1.8 | 11 | 11 | — | 11 | 11 | 11 |
| | | (c) | PB1 | | 30 | 30 | | 50 | 15 | 40 | |
| | | | PB2 | | | | 30 | | | | |
| | | | PB3 | | | | | | | | |
| | | | MFR | — | 1.8 | 1.8 | 4 | 1.8 | 1.8 | 1.8 | — |
| | Content of component (b): content of component (c) | | | 50:0 | 50:50 | 50:50 | 50:50 | 0:50 | 50:50 | 50:50 | 50:0 |
| | Thickness of heat-sealing layer (μm) | | | 7.5 | 7.5 | 7.5 | 7.5 | 7.5 | 7.5 | 7.5 | 7.5 |
| | Resin formulation of support layer (mass %) | | PE1 | 50 | 50 | 50 | 50 | 50 | 50 | 50 | 50 |
| | | | PE2 | 50 | 50 | 50 | 50 | 50 | 50 | 50 | 50 |
| | Thickness of support layer (μm) | | | 42.5 | 42.5 | 42.5 | 42.5 | 42.5 | 42.5 | 42.5 | 42.5 |
| | Total thickness (μm) | | | 50 | 50 | 50 | 50 | 50 | 50 | 50 | 50 |
| Results of evaluation | Release mark width | | | B | C | B | A | A | A | B | A |
| | Release mark whitening degree | | | C | A | B | B | A | C | A | C |
| | Sealing strength (before retort) (N/15 mm) | | | 15 | 17 | 16 | 15 | 16 | 23 | 25 | 15 |
| | Sealing strength (after retort) (N/15 mm) | | | 15 | 16 | 16 | 8 | 9 | 13 | 24 | 12 |

As can be seen from Table 1, in Examples 1 to 9 in which the resin composition or the like forming the heat-sealing layer contains the high-density polyethylene (a), propylene random copolymer (b), and 1-butene polymer (c), and the contents and melt flow rates of these components are in their respective predetermined ranges, the width of the release mark and the whitening degree of the release mark are large, and the sealing strengths measured before and after subjected to retort treatment are in an appropriate range. Accordingly, the multilayer films in Examples 1 to 9 have an appropriate sealing strength and heat resistance, and further are able to cause a release mark having high visibility after peeling the lidding material off.

In contrast, in Comparative Examples 1 to 8 in which the resin composition or the like forming the heat-sealing layer does not contain any one of the high-density polyethylene (a), propylene random copolymer (b), and 1-butene polymer (c), or the contents and melt flow rates of these components are not in their respective predetermined ranges, it is apparent that the width of the release mark and the whitening degree of the release mark are not increased, and the sealing strengths measured before and after subjected to retort treatment are not in an appropriate range.

INDUSTRIAL APPLICABILITY

In the present disclosure, there can be provided a multilayer film which has an appropriate sealing strength and heat resistance, and further is able to cause a release mark having high visibility after peeling the lidding material off, a laminated film, and a packaging material.

The invention claimed is:

1. A multilayer film having at least a heat-sealing layer and a support layer formed on one side of the heat-sealing layer, wherein the first resin composition forming the heat-sealing layer comprises (a) high-density polyethylene, (b) a propylene random copolymer, and (c) a 1-butene polymer, wherein when the total content of the high-density polyethylene (a), the propylene random copolymer (b), and the 1-butene polymer (c) is 100% by mass, the content of the high-density polyethylene (a) is 30 to 60% by mass, the content of the propylene random copolymer (b) is 8 to 42% by mass, and the content of the 1-butene polymer (c) is 16 to 56% by mass, wherein the high-density polyethylene (a) has a melt flow rate of 10 to 30 g/10 minutes at 190° C., the propylene random copolymer (b) has a melt flow rate of 8 to 20 g/10 minutes at 230° C., and the 1-butene polymer (c) has a melt flow rate of 0.3 to 3 g/10 minutes at 190° C.

2. The multilayer film according to claim 1, wherein the ratio of the content of the propylene random copolymer (b) and the content of the 1-butene polymer (c) (component (b):component (c)) is 20:80 to 60:40.

3. The multilayer film according to claim 1, wherein the second resin composition forming the support layer comprises an ethylene resin having a melt flow rate of 0.1 to 1.0 g/10 minutes at 190° C. as a main component.

4. The multilayer film according to claim 1, wherein the propylene random copolymer (b) is a propylene-ethylene random copolymer.

5. The multilayer film according to claim 1, wherein the monomer of the 1-butene polymer (c) is 1-butene.

6. The multilayer film according to claim 1, which has a thickness of 15 to 100 μm.

7. The multilayer film according to claim 1, wherein the ratio of the thickness of the heat-sealing layer and the thickness of the support layer (heat-sealing layer:support layer) is 5:95 to 30:70.

8. A laminated film having the multilayer film according to claim 1, and a substrate layer laminated on one side of the support layer of the multilayer film.

9. The laminated film according to claim 8, which is used as a lidding material in a packaging material.

10. A packaging material comprising a packaging container having a heat-sealing surface at an opening portion, and the laminated film according to claim 8 for sealing the opening portion.

* * * * *